Aug. 22, 1950 F. M. OLIN 2,519,693
DEVICE FOR SETTING EXPANSION
SCREW BASES IN HOLES
Filed April 12, 1947
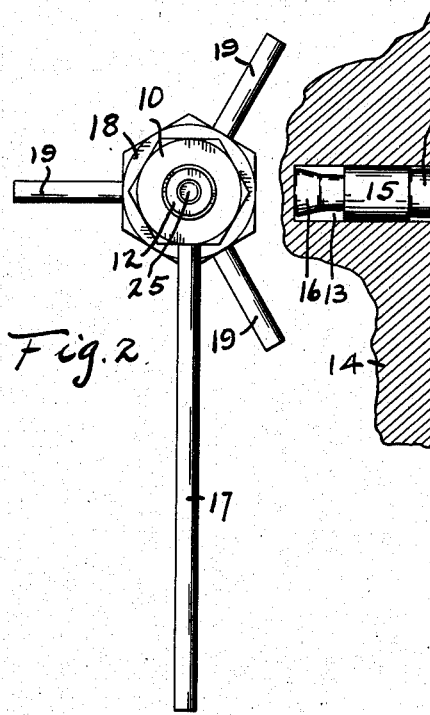
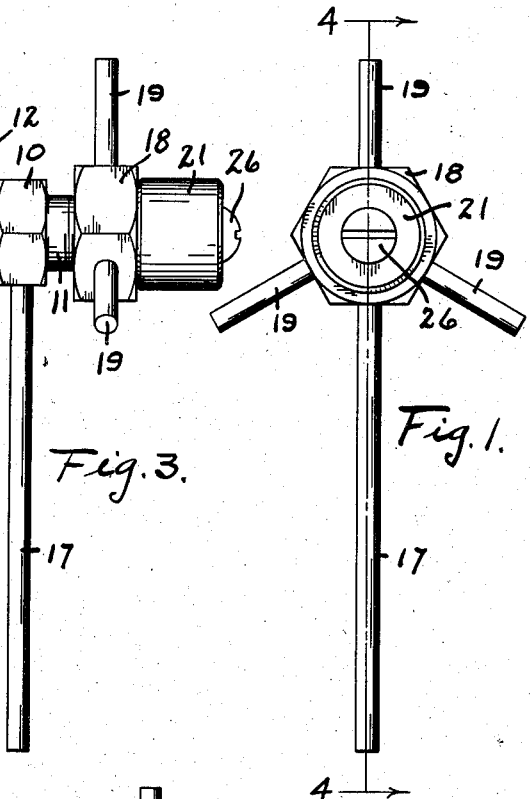
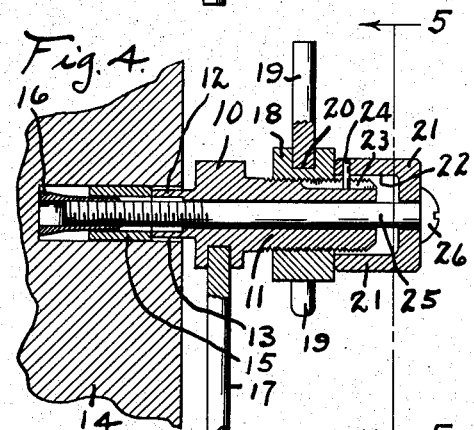
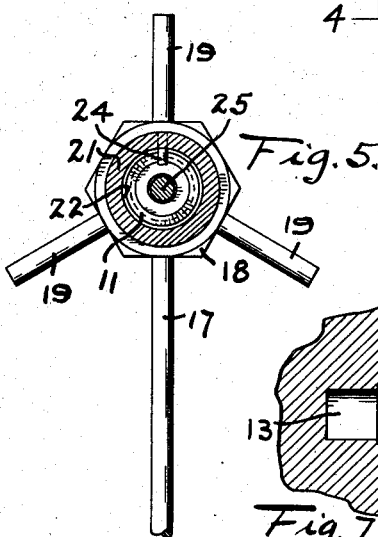
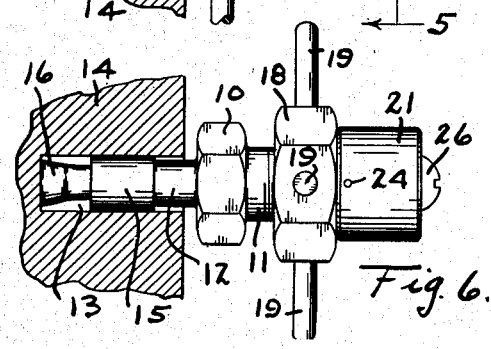
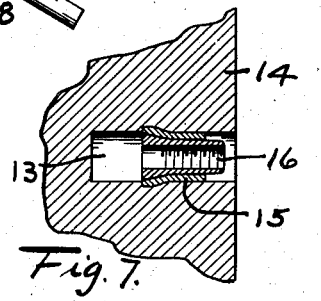
INVENTOR,
FRANK M. OLIN,
By Herbert A. Minturn,
ATTORNEY.

Patented Aug. 22, 1950

2,519,693

UNITED STATES PATENT OFFICE 2,519,693

DEVICE FOR SETTING EXPANSION SCREW BASES IN HOLES

Frank M. Olin, Indianapolis, Ind.

Application April 12, 1947, Serial No. 741,130

2 Claims. (Cl. 218—19)

This invention relates to a device for setting expansion screw bases in holes. A primary object of the invention is to provide such a device wherein no hammering on the base or any part thereof is required and wherein a screw may be employed to effect the setting of the base, this screw being apart from the screw to be used normally with the base.

A further important object of the invention is to provide a structure for the purposes above indicated wherein the setting action is accomplished without the turning of a screw member in the threads of the base structure. A still further important object of the invention is to provide such a structure wherein positive means are incorporated to prevent any possibility of the turning of the screw threaded member while the setting operation is being accomplished. In this regard, my invention contemplates the use of a screw which may be used over and over again to initially engage in the screw threaded member of the base as a means of interconnecting that member with the screw. This screw member may be of varying lengths depending upon the position within a hole where the screw base is to be set.

These and many other objects and advantages of the invention including the unique and simplified parts and assembly thereof forming the structure, will become apparent to those versed in the art in the following description of one particular form of the invention as illustrated in the accompanying drawing, in which Fig. 1 is a view in outside end elevation;

Fig. 2, a view in opposite end elevation;

Fig. 3, a view in side elevation in position ready to set a screw base within a hole in a wall shown in section;

Fig. 4, a view in section on the line 4—4 in Fig. 1;

Fig. 5, a view in transverse section on the line 5—5 in Fig. 4;

Fig. 6, a view in top plan, and

Fig. 7, a view in central vertical section through the expansion screw base after being set.

Referring to the drawing in which like characters of reference indicate like parts throughout the several views, I form a head 10 having an outer end portion 11 externally threaded. On the other end of the head 10 is a nipple 12 having an external diameter which will permit it to be inserted freely within a hole 13 in a wall 14 (the term wall intended to be sufficiently inclusive to include a floor, ceiling or the like), within which hole 13 the base of the expansion screw embodying the usual lead sleeve 15 and tapered nut 16 is inserted.

In the form herein shown, the central portion of the body 10 is made to be hexagonal in shape so as to permit the holding of the body by any suitable means such as a wrench, against turning. Normally the body 10 may be held against turning by the simple expedient of employing an elongated pin 17 inserted in or fixed to the body 10. The pin 17 is shown as extending from the body 10 substantially at right angles to the axis of the body.

On the screw threaded portion 11 is carried a nut 18 free to be revolved therearound as a means of causing it to travel longitudinally of that portion 11. This nut 18 may have any desirable external shape, herein shown as being hexagonal to permit the use of a wrench thereon if desirable. However, for quick manipulation of the nut 18, normally pins 19, herein shown as three in number, are fixed to the nut 18 to extend radially therefrom. These pins may be secured permanently to the nut 18 or may be removably received thereby such as by inserting the inner end of the pin 19 in each instance within a socket 20 provided in the nut. A cap 21 is provided to have an internal bore 22 sufficiently great in diameter as to permit the cap 21 to be freely received over the outer end of the body portion 11. The body portion 11 is provided with a keyway 23 extending longitudinally across the threaded portion to receive a pin 24 slidingly therein, this pin 24 being fixed to the cap 21 near its mouth to extend radially inwardly from the wall of the cap.

A screw 25 is selected to have sufficient length to extend through the end of the cap 21 rotatably throughout the body 10 and to extend on inside of the sleeve 15 to screw threadedly engage with the nut 16, Fig. 4. As indicated, the underside of the head 26 of this screw 25 normally bears against the outer end face of the cap 21.

In operation, the members 15 and 16 are inserted within the hole 13 in the relation indicated in Fig. 4. Then the body 10 is brought up to have the nipple 12 seated against the outer end of the sleeve 15. The length of this nipple 12 may be varied for different jobs depending upon the depth within the hole 13 at which the sleeve is desired to be limited. In any event, the end of the nipple 12 abuts the outer end of the sleeve 15. Normally the sleeve 15 and nut 16 will be assembled in the relation shown in Fig. 4 externally of the hole 13 to have the sleeve 15 abut the end of the nipple 12 with the nut 16 entered within the sleeve 15 without a tendency to expand the sleeve. That is the screw 25 by being threaded in the nut 16 ties the sleeve 15 and nut 16 to the body 10, whereby by using the handle or pin 17, the sleeve 15 and nut 16 are inserted in the hole 13. Here the outer end of the nut 16 is shown in the drawing as abutting the bottom of the hole 13. This is not necessary since the sleeve 15 can be pulled outwardly toward the face of the wall 14.

The nut 18 is initially positioned on the body portion 11 adjacent the inner ends of the threads. By revolving the nut 18 to cause it to travel outwardly the cap 21 is pushed outwardly and in turn pulls the screw 25 outwardly to carry the nut 16 into the sleeve 15 to achieve the resultant effect illustrated in Fig. 7 where the sleeve 15 has been expanded, possibly in an exaggerated form, and is held in that position by the presence of the nut 16 therein. Then the nut 18 is reversed in travel to allow the cap 21 to be positioned inwardly away from the screw head 26, whereupon this screw 26 may be turned to withdraw it from the nut 16. It is to be noted that this screw 25 is a part of the tool itself and is not intended to be used in permanent connections with the nut 16 after the setting of the sleeve 15. Further it is important to note that at no time is there any tendency to turn the screw 25 by turning the nut 18 by reason of the fact that the cap 21 is inserted between that nut and the screw. Thus there is no tendency for the screw threads to be worn or cut within the nut 16 as has heretofore been the case when the turning of the screw 25 was utilized as the means for drawing the nut 16 within the sleeve 15. Since the nut 16 is necessarily made to be thin walled the internal threads of that nut are quite easily damaged. Such damage obviously must not be permitted, otherwise the retaining qualities of the nut 16 for permanent mounting purposes are lost.

While I have herein shown and described my invention in the one particular form, it is obvious that structural changes may be made such for example, as in the shape in the holding pin 17, the shape of the nut 18, and in the various proportions of the parts all without departing from the spirit of the invention, and I therefore do not desire to be limited to that precise form beyond the limitations which may be imposed by the following claims.

I claim:

1. The combination of a body having an externally threaded rear end portion and an axial bore therethrough; a nut screw threadedly engaged around said portion; a cap loosely fitted over said portion to extend thereover and abut said nut; means holding said cap against revolution relative to said body upon turning of said nut thereagainst; and a screw threaded member carried by said cap and extending freely through said bore and past the front end portion thereof.

2. The combination of a body having an externally threaded rear end portion and an axial bore therethrough; a nut screw threadedly engaged around said portion; a cap loosely fitted over said portion to extend thereover and abut said nut; means holding said cap against revolution relative to said body upon turning of said nut thereagainst; and a screw threaded member carried by said cap and extending freely through said bore and past the front end portion thereof; said means consisting of a keyway across said threaded portion of the body, and a pin fixed to said cap entered in said keyway.

FRANK M. OLIN.

REFERENCES CITED

The following references are of record in the file of this patent:

UNITED STATES PATENTS

| Number | Name | Date |
| --- | --- | --- |
| 1,177,843 | Ackerman | Apr. 4, 1916 |
| 2,370,776 | Carlson | Mar. 6, 1945 |
| 2,377,077 | Gay | May 29, 1945 |
| 2,410,476 | Appleton | Nov. 5, 1946 |